United States Patent Office 3,501,929
Patented Mar. 24, 1970

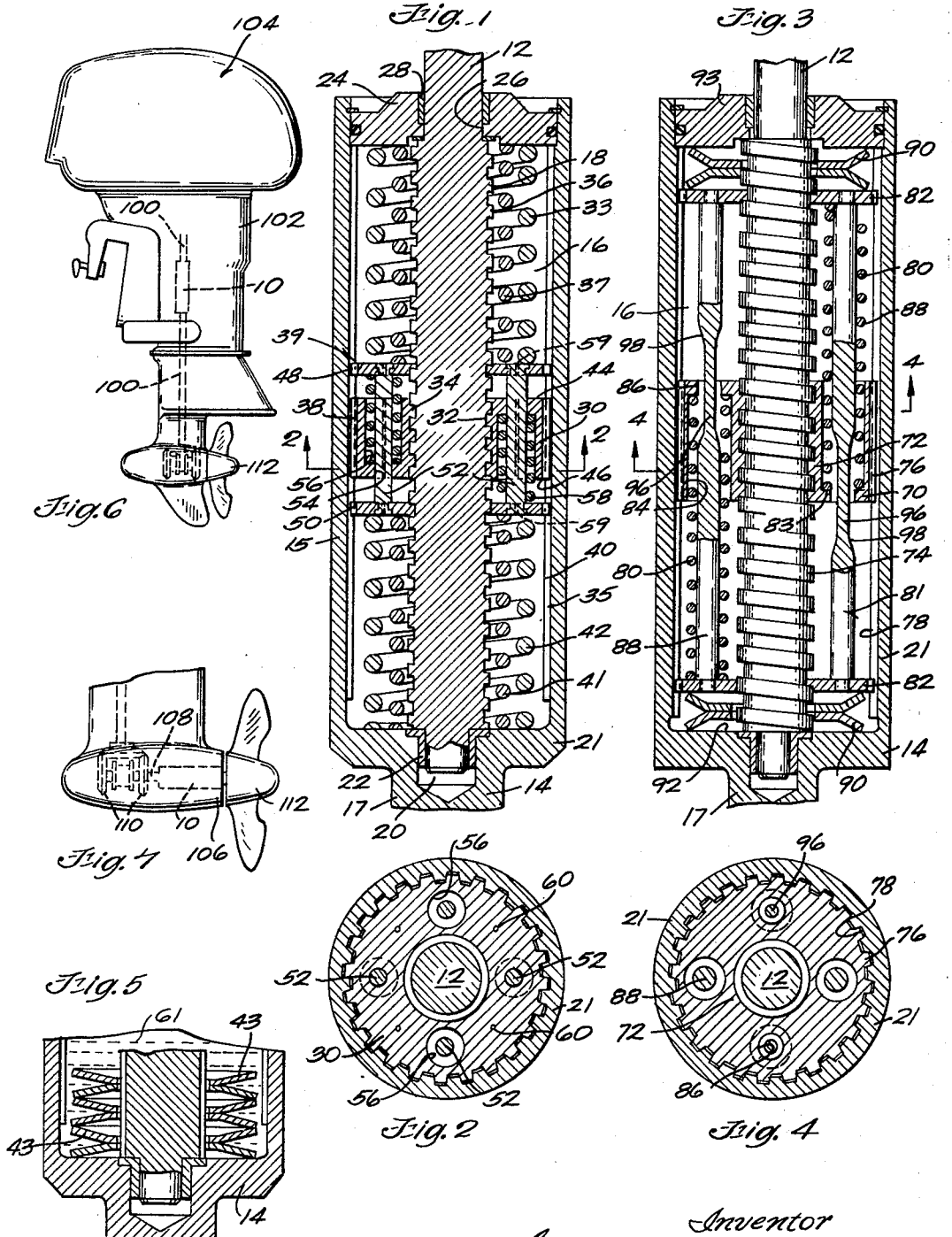

3,501,929
TORSIONAL SHOCK ABSORBER
Gerald E. Kashmerick, Waukegan, Ill., assignor to Outboard Marine Corporation, Waukegan, Ill., a corporation of Delaware
Filed Nov. 1, 1967, Ser. No. 679,751
Int. Cl. F16d 3/14
U.S. Cl. 64—27        11 Claims

ABSTRACT OF THE DISCLOSURE

A torsional shock absorber comprising an output shaft with a hollow interior, and a co-axial input shaft having a threaded portion located within the hollow interior. The input shaft is connected to the output shaft by a nut carried on the threaded portion of the input shaft. The nut has an external spline which interfits with a spline on the hollow interior of the output shaft. Springs on each side of the nut center the nut in the hollow interior. Hydraulic fluid in the hollow interior and fluid flow orifices in the nut restrain axial movement of the nut.

BACKGROUND OF THE INVENTION

The invention relates to shock absorbers and more particularly to rotational or torsional shock absorbers intended to reduce the severity of shock loads in a torque transmitting drive train.

SUMMARY OF INVENTION

The torsional shock absorber of the invention comprises an input shaft having a threaded portion located in the hollow interior of an output shaft. The connection between the input shaft and the output shaft is in the form of a nut or piston threaded on a portion of the input shaft. A spline on the periphery of the nut interfits with an internal spline on the interior wall of the hollow output shaft. The nut is centered on the spline in the hollow interior by an arrangement of springs on each side of the nut.

Axial travel of the nut within the hollow interior in response to rotation of the input shaft is damped or restricted by hydraulic fluid filling the hollow interior and fluid flow orifices in the nut and regulator plates. Rotation of the input shaft does not cause a simultaneous rotation of the output shaft. The lost motion afforded by the use of the nut causes the output shaft to slowly pick up rotational speed while the nut travels along the threaded input shaft. The lost motion and shock absorbing capacity can be regulated by varying such parameters as the length of nut travel, the spring rates and configurations, the hydraulic fluid regulation, routing, and viscosity of fluid.

The rotational or torsional shock absorber of the invention can be utilized as a coupling between input and output shafts or constructed integral with the shafts. The invention is particularly suitable for absorbing and reducing the severity of torsional shocks caused by engine impulses or gear shifting in a drive train. The compact size of the shock absorber adapts it for use in the drive train of a marine propulsion unit.

Further objects and advantages of the invention will become apparent from the following disclosure.

DRAWINGS

FIGURE 1 is a longitudinal sectional view of the torsional shock absorber of the invention.

FIGURE 2 is a sectional view along line 2—2 of FIGURE 1.

FIGURE 3 is a longitudinal sectional view of a modified embodiment of the torsional shock absorber of the invention.

FIGURE 4 is a sectional view along line 4—4 of FIGURE 3.

FIGURE 5 is a fragmentary longitudinal sectional view of a modification of the embodiment disclosed in FIGURE 1.

FIGURE 6 is a side view of a marine propulsion device embodying the invention, with the torsional shock absorber located in the drive shaft housing.

FIGURE 7 is a side view of a lower unit gear case of a marine propulsion unit incorporating the invention.

DETAILED DESCRIPTION

In the drawings, there is shown in FIGURE 1 a torsional or rotary shock absorber which is generally designated 10, and which includes an input shaft 12 and a coaxial output shaft 14. The output shaft 14 has a portion 15 with a hollow interior 16 and a smaller diameter solid portion 17. A portion 18 of the input shaft is located within the interior 16 of the output shaft 14.

Means are provided to rotatably support the input shaft 12 in the output shaft 14. In this regard, the forward end of the input shaft 12 extends into a bore 20 in the end wall 21 of the output shaft 14 and is journaled in a bearing 22 located in the bore 20. Such means also includes, as a part of the output member 14, an end wall 24 with an aperture 26 and a bearing 28 located in aperture 26, with the input shaft journaled in the bearing 28.

In accordance with the invention, means are provided for connecting the input shaft 12 to the output shaft 14 to afford rotary motion of the output shaft 14 responsive to rotary motion of the input shaft after an initial amount of angular lost motion, i.e., so that the angular velocity of the output shaft is initially or momentarily less than the input shaft. In the disclosed construction, such means includes a nut or piston 30 having an axial bore 32 provided with an internal thread or helical spline 34 which is complementary to and interfits with an external thread or helical spline 36 on the portion 18 of the input shaft located within the hollow interior 16.

The means for connecting the input and output shafts also includes means for connecting the nut 30 to the output shaft 14 to afford axial travel of the nut and rotation of the output shaft upon rotation of the nut 30. In the disclosed construction, such means comprises an external straight spline 38 on the nut 30 and an internal complementary spline 35 on the internal wall 40 of the output shaft 14.

In operation of the device as thus far described, initial rotary motion of the input shaft will cause relative movement of the input shaft 12 to the nut 30, and thus axial travel of the nut 30 on the input shaft 12. As the inertia of the nut 30 and the output shaft and any load carried by the output shaft is overcome by the torque of the input shaft, the angular velocity of the output shaft will increase until the nut 30 and the output shaft rotate at the same speed as the input shaft. Thus, the lost motion afforded by the inertia of the nut and output shaft will prevent simultaneous rotation of the output shaft 14 upon initial rotation of the input shaft 12. The lost motion and the increasing angular velocity of the output shaft tend to reduce transfer of torsional shocks or momentary increases in torque providing a smooth transfer of power.

To center the nut 30 in the hollow interior 16 of the output shaft and limit movement of the nut, so as to assure rotary movement of the output member 14, there is provided means for yieldably biasing the nut to a centered position in the hollow interior 16. Such means also limits axial travel of the nut 30. In the construction illustrated in FIGURE 1, such means includes a regulator plate assembly 39 and springs 37 and 33 telescoped over the shaft portion 18 located on one side of the nut 30 and bearing against the end wall 24, together with springs 41 and 42 telescoped over the shaft portion 18 located on the other side of the nut 30 with the ends of the springs 41 and 42 bearing against the end wall 21.

In the embodiment shown in FIGURE 1, the springs engage regulator plates 48 and 50 located on opposite sides of the nut 30. In the alternative, the inner ends of the springs can bear against the opposed faces 44 and 46 of the nut rather than the regulator plates 48, 50 to yieldably bias the nut to a centered position. The regulator plates 48 and 50 form a part of the means for damping nut movement as hereinafter described.

As shown in FIGURE 5, an alternate construction could utilize an array of serially arranged belleville washers 43, located in the hollow interior 16 and over input shaft portion 18.

The invention also includes means for damping axial travel of the nut 30 independent of the springs 37, 33, 41, 42. In the FIGURE 1 construction, such means includes the regulator plate assembly 39 which comprises regulator plates 48 and 50 which are connected by a plurality of guide rods 52, four rods being employed in the disclosed construction, with each rod 52 extending through respective axial apertures 54 in the nut 30. Each aperture 54 is provided with a counterbore 56. Two of the counterbores open on the side of the nut 30 adjacent the plate 48 and two of the counterbores open on the side of the nut adjacent the plate 50. Located in the counterbores 56 are springs 58 for centering the nut 30 between the plates 48 and 50.

Also included in the damping means is hydraulic fluid 61 in the interior 16 and a plurality of flow orifices 59 in each of the regulator plates 48 and 50, and a plurality of axially extending flow orifices 60 in the nut. Axial movement of the nut is damped by the restriction to fluid flow afforded by the orifices.

The orifices in the regulator plates and the nut 30 are angularly offset so that upon travel of the nut into engagement with one of the regulator plates 48, 50, such engagement effectively seals the majority of the orifices 59 and 60 and increases the damping action or resistance to nut travel. Thus, the means damping axial movement of the nut initially provides less resistance to nut movement within the predetermined range between the plates 48 and 50. The damping action then increases as the nut faces approach engagement with the regulator plates 48, 50 to block fluid flow through the orifices 59 and 60. Clearance between the nut 30 and the threaded portion 18 and between the nut 30 and the internal spline 35 affords an additional path for fluid flow to permit nut travel after the nut 30 has bottomed out on one of the regulator plates 58, 60. When this occurs, the nut 30 and the regulator plate assembly 39 can move together axially of the input shaft 12.

With the embodiment shown in FIGURE 1, the lost motion between the input shaft 12 and the output shaft 14 is increased when changing the direction of rotation of the input shaft, as for instance, when shifting gears. If the input shaft 12 is rotated in one direction, and the nut 30 is bottomed against one of the regulator plates 48, 50, and the direction of rotation of the input shaft is reversed before the nut 30 has been centered by the spring 58, the nut can travel the full distance from one regulator plate to the other during the reversal of rotation.

Referring to FIGURE 3, a further embodiment of the invention is disclosed. As with the embodiment disclosed in FIGURE 1, the means connecting the input shaft 12 to the output shaft 14 includes a nut 70 having an internal spline 72 which is complementary with an external spline 74 on the input shaft. The nut 70 is also provided with an external spline 76 which is complementary to and interfits with an internal spline 78 on the internal wall of the output shaft 14. In this embodiment the means provided for yieldably biasing the nut to a centered position in the hollow interior 16 of the output shaft 14 comprises a plurality of springs 80 each having one end engaging plates 82 of regulator plate assembly 81, and the other end engaging the bottom 83 of counterbores 84 of apertures 86 in the nut 70. The plates 82 are connected by regulator guide rods 88. The springs 80 are telescoped over the rods 88. To center the regulator plate assembly 81 in the interior 16, belleville washers 90 are provided between the plates 82 and the end walls 92 and 93.

The means for damping travel of the nuts 30 independently of the springs 80 comrpises orifices 86 in the nut which cooperate with a smaller diameter portion 96 of the guide rods 88 of the regulator plate assembly to control fluid flow through the orifices 94. When the travel of the nut 70 reaches the tapered portions 98 of the guide rods 88 the effective orifice 94 is gradually closed increasing the damping action and resistance to nut travel. The tapered portions of the guide rods are arranged so that equal damping action will be afforded with travel of the nut from a centered position in either direction within the hollow interior of the output shaft.

The torsional shock absorber of the invention can be utilized as a coupling between input and output shafts with coupling connectors located on shaft 12 and shaft portion 17 of the output shaft. In the alternative, the torsional shock absorber can be constructed integral with the input and output shafts as shown in FIGURES 6 and 7. In FIGURE 6 there is shown an outboard motor including a marine propulsion unit 104 having a lower unit comprising a drive shaft housing 102, and a depending gear case 106 containing a shift mechanism. The torsional shock absorber 10 forms a portion of the drive train 100 and is located in the drive shaft housing 102 of the marine propulsion unit 104.

In FIGURE 7 the torsional shock absorber is shown located in the lower unit gear case 106 of a marine propulsion unit. In this arrangement the torsional shock absorber 10 forms a portion of the propeller shaft 108 connecting the gears 110 to the propeller hub 112. In this application the torsional shock absorber of the invention absorbs the shock loads or pulses caused by mechanical shifting of the gears 110 or propeller impacts.

The shock absorbing action of the disclosed devices can be closely regulated by varying such parameters as the total length of nut travel, the helix angles of the splines, the spring rates and configurations, the co-efficients of friction, the spline diameters and pressure angles and the hydraulic fluid regulation, routing and viscosity of fluid.

What is claimed is:

1. A device for absorbing torsional shocks in a rotary drive train comprising a first shaft, a co-axial second shaft having a hollow interior with a portion of said first shaft being located within said hollow interior of said second shaft, a nut located within said interior of said second shaft and threaded on said first shaft for axial travel on said first shaft for axial travel on said first shaft, means for connecting said nut to said second shaft to afford axial travel of said nut relative to said first and second shafts and upon rotation of one of said first and second shafts, hydraulic fluid in said hollow interior, and means cooperating with said hydraulic fluid for damping movement of said nut, said means initially affording a first resistance to movement of said nut for a predetermined distance and affording a second resistance greater in magnitude than said first resistance, upon movement of said nut beyond said predetermined distance.

2. A device in accordance with claim 1, wherein said means for damping movement of said nut comprises flow orifices in said nut, apertures in said nut, said apertures having counterbores, some of said counterbores being on one side of said nut and other of said counterbores being on the other side of said nut, a pair of spaced regulator plates, each of said regulator plates being on the opposite sides of said nut and spaced from said nut, rods connecting said regulator plates, said rods extending through said apertures and counterbores, springs arranged around each of said rods between said regulator plates and the bottoms of said counterbores and end walls at the ends of said hollow interior of said output shafts and springs arranged around the input shaft and located between said end walls and said regulator plates.

3. A device in accordance with claim 1, wherein said means cooperating with said hydraulic fluid for damping travel of said nut comprises through apertures in said nut, counterbores for each of said apertures, some of said counterbores opening on one side of said nut and some of said counterbores opening on the other side of said nut, guide rods extending through said apertures and said counterbores in said nut, a pair of plates, the ends of said guide rods being connected to said plates, means for connecting said plates to said output shaft, each of said rods having tapered portions, said tapered portions cooperating with said apertures in said nut to vary fluid flow through said apertures upon movement of said nut relative to said tapered portions.

4. A device for absorbing torsional shocks in a rotary drive train comprising a first shaft, a co-axial second shaft having a hollow interior with said first shaft having a shaft portion located within said hollow interior of said second shaft, an external thread on said first shaft, a nut located within said interior of said second shaft and threaded on said first shaft for axial travel on said first shaft, said nut including apertures, an end wall in said second shaft, an end plate at the other end of said second shaft and including an aperture receiving said first shaft, a regulator plate assembly located within said hollow interior, said regulator plate assembly including opposed regulator plates located within said interior with one plate on each side of said nut and spaced from the nut, and rods extending through said apertures in said nut and connecting said regulator plates, springs located within said hollow interior of said output shaft on each side of said nut between said regulator plates and said end plate and between said regulator plate and said end wall, and means to center said nut between said regulator plates.

5. The device of claim 4 wherein said means to center said nut between said regulator plates comprises counterbores in said nut and springs having a portion located in said counterbores and a portion bearing against said regulator plates.

6. The device of claim 5 including means for damping travel of said nut and wherein said means comprises hydraulic fluid in said hollow interior, flow orifices in said regulator plates, flow orifices in said nut, and whereby movement of said nut into engagement with one of said regulator plates will seal at least one of said orifices in said nut and in said regulator plates to increase the damping action on said nut.

7. A device for absorbing torsional shocks in a rotary drive train comprising an input shaft adapted to be connected to a power source, a co-axial output shaft having a hollow interior with said input shaft located within said hollow interior of said output shaft, an external thread on said input shaft, a nut located within said interior of said output shaft and threaded on said input shaft for axial travel on said input shaft, said nut including apertures, said apertures having counterbores, guide rods extending through said apertures and said counterbores, said guide rods having two tapered portions which cooperate with said apertures to regulate fluid flow through said nut, a pair of plates, each of said plates receiving ends of said guide rods, springs telescoped over said guide rods and located between the bottom of said counterbores and said regulator plates, and means for connecting said nut to said output shaft to afford axial travel of said nut relative to said input and output shafts and to afford rotation of said output shaft upon rotation of said nut.

8. A device in accordance with claim 7 wherein said counterbores extend into opposite sides of said nut from opposite directions and said tapered portions on said regulator rods are offset, whereby equal damping action is afforded upon travel of the nut from a centered position in either direction.

9. A marine propulsion unit comprising an engine output shaft, a marine propulsion lower unit including a drive shaft housing, and a gear case, a propeller shaft rotatably supported in said gear case, and a drive train in said lower unit and including a first shaft, a co-axial second shaft having a hollow interior with a portion of said first shaft located within said hollow interior of said second shaft, a shift mechanism in said gear case connected to said propeller shaft and to one of said first and second shafts, the other of said first and second shafts being connected to said engine output shaft, a nut located within said interior of said second shaft and threaded on said first shaft for axial travel on said first shaft, and means for connecting said nut to said second shaft to afford axial travel of said nut relative to said second shaft and to afford rotation of said second shaft upon rotation of said nut, and means for yieldably biasing said nut to a centered position within said interior of said second shaft and for limiting axial travel of said nut.

10. A marine propulsion unit in accordance with claim 9, wherein one of said first and second shafts is located in said drive shaft housing and is connected to said engine output shaft and the other of said first and second shafts is located in said drive shaft housing and is connected to said propeller shaft.

11. A marine propulsion unit comprising an engine output shaft, a marine propulsion lower unit including a drive shaft housing, a gear case, a propeller shaft rotatably supported in said gear case, and a drive train in said lower unit and including a first shaft, a co-axial second shaft having a hollow interior with a portion of said first shaft located within said hollow interior of said second shaft, said first and second shafts being located in said gear case and one of said first and second shafts comprising said propeller shaft and the other of said first and second shafts being connected to said engine output shaft, a nut located within said interior of said second shaft and threaded on said first shaft for axial travel on said first shaft, and means for connecting said nut to said second shaft to afford axial travel of said nut relative to said second shaft and to afford rotation of said second shaft upon rotation of said nut, and means for yieldably biasing said nut to a centered position within said interior of said second shaft and for limiting axial travel of said nut.

References Cited

UNITED STATES PATENTS

| 1,009,846 | 11/1911 | Mann. | |
| 1,387,384 | 8/1921 | Gooddard | 64—27 |
| 1,974,784 | 9/1934 | Pilcher | 64—27 |
| 3,199,315 | 8/1965 | Morse | 64—27 |

FOREIGN PATENTS

| 1,028,393 | 2/1953 | France. |

FRED C. MATTERN, Primary Examiner

MANUEL A. ANTONAKAS, Assistant Examiner